United States Patent
Swanson et al.

[11] Patent Number: 6,054,001
[45] Date of Patent: Apr. 25, 2000

[54] VEHICLE ASSEMBLY LINE-SIDE HEAT ACTIVATION OF A "READY-TO-INSTALL" WINDOW FIXING ADHESIVE FOR ATTACHMENT OF A VEHICLE WINDOW TO A VEHICLE

[75] Inventors: Douglas R. Swanson, Kentwood; David E. Nestell, Spring Lake; Niall R. Lynam, Holland, all of Mich.

[73] Assignee: Donnelly Corporation, Holland, Mich.

[21] Appl. No.: 09/024,226

[22] Filed: Feb. 17, 1998

[51] Int. Cl.$^7$ ..................................................... B32B 31/26
[52] U.S. Cl. .................. 156/108; 156/273.3; 156/309.9; 156/320; 156/380.9; 392/423
[58] Field of Search .......................... 156/99, 108, 273.3, 156/275.7, 309.9, 320, 380.9; 392/418, 422, 423

[56] References Cited

U.S. PATENT DOCUMENTS

| | | |
|---|---|---|
| 1,813,425 | 7/1931 | Rosaire . |
| 3,347,729 | 10/1967 | Seefluth .................................. 156/380 |
| 3,388,945 | 6/1968 | Kevelin et al. ......................... 296/145 |
| 3,527,663 | 9/1970 | Rose et al. .............................. 161/45 |

(List continued on next page.)

FOREIGN PATENT DOCUMENTS

| | | |
|---|---|---|
| 061183 | 9/1982 | European Pat. Off. . |
| 081426 | 6/1983 | European Pat. Off. . |
| 209762 | 1/1987 | European Pat. Off. . |
| 364191 | 4/1990 | European Pat. Off. . |

(List continued on next page.)

OTHER PUBLICATIONS

European Search Report.
English Abstract for WO 94/18255, Aug. 18, 1994, PCT.
German Abstract No. 3,124,138, dated Dec. 30, 1982.
Japanese Abstract No. 58 194,513, dated Nov. 12, 1983.

(List continued on next page.)

*Primary Examiner*—Michael W. Ball
*Assistant Examiner*—Michael A Tolin
*Attorney, Agent, or Firm*—Van Dyke, Gardner, Linn & Burkhart, LLP

[57] ABSTRACT

A method of and apparatus for activating a ready-to-install heat activated adhesive for attaching a vehicle panel to a vehicle is disclosed which provides a "ready-to-install" panel assembly. The panel assembly includes first and second spaced apart surfaces, with the bead of heat activated adhesive provided on the second surface of the panel. The panel and bead are heated preferably by applying shortwave and longwave infrared radiation, with the shortwave infrared radiation being applied to an adhesive free side of the panel to heat the panel and, thereby, indirectly heat the bead of the heat activated adhesive. For example, where the window panel is such as a laminated windshield or side window or backlite comprising two glass sheets laminated with a polymer inner layer, such as plasticized polyvinyl butyral, or silicone or the like, it is preferable that the heat activation temperature of the adhesive be less than or equal to about 125° C., more preferably less than or equal to about 115° C., and most preferably less than or equal to about 105° C. Also, when a ready-to-install adhesive is applied on or adjacent to a gasket such as a polyvinyl chloride (PVC) molding, a urethane molding, or the like, it is preferable that the heat activation temperature of the adhesive be about less than or equal to about 125° C., more preferably less than or equal to about 115° C., and most preferably less than or equal to about 105° C. The longwave infrared radiation is applied to the adhesive side of the panel to directly heat the bead and thereby activate the adhesive. The apparatus includes a first heating component and a second heating component, with the first heating component including a source of shortwave infrared radiation, such as one or more lamps, which is adapted to heat the adhesive free side of the panel for indirectly heating the bead of adhesive. The second heating component includes a source of longwave radiation, for example a quartz emitter, which is applied the second side of the panel to directly heat the bead of adhesive.

54 Claims, 5 Drawing Sheets

6,054,001
Page 2

U.S. PATENT DOCUMENTS

| | | | |
|---|---|---|---|
| 3,542,619 | 11/1970 | McManus | 156/275 |
| 3,573,149 | 3/1971 | Tibble et al. | 161/45 |
| 3,574,024 | 4/1971 | Rose | 156/108 |
| 3,645,817 | 2/1972 | Walker et al. | 156/108 |
| 3,654,005 | 4/1972 | Higgins et al. | 156/108 |
| 3,756,881 | 9/1973 | Denman | 156/108 |
| 3,867,222 | 2/1975 | Plant et al. | 156/107 |
| 4,039,720 | 8/1977 | Cherenko et al. | 428/425 |
| 4,110,148 | 8/1978 | Rocholl | 156/359 |
| 4,184,000 | 1/1980 | Denman | 428/347 |
| 4,391,663 | 7/1983 | Hutter, III | 156/64 |
| 4,455,186 | 6/1984 | Koehmstedt | 156/273.9 |
| 4,506,125 | 3/1985 | Smets et al. | 219/10.53 |
| 4,571,278 | 2/1986 | Kunert | 156/108 |
| 4,581,276 | 4/1986 | Kunert et al. | 428/157 |
| 4,704,175 | 11/1987 | Kunert et al. | 156/108 |
| 4,820,365 | 4/1989 | Brumm et al. | 156/109 |
| 4,910,071 | 3/1990 | Kunert | 428/192 |
| 4,933,032 | 6/1990 | Kunert | 156/108 |
| 4,938,521 | 7/1990 | Kunert | 296/96.21 |
| 4,950,348 | 8/1990 | Larsen | 156/275.3 |
| 5,035,045 | 7/1991 | Bowen et al. | 29/623.2 |
| 5,057,354 | 10/1991 | Kunert et al. | 428/192 |
| 5,061,332 | 10/1991 | Stolz et al. | 156/94 |
| 5,064,494 | 11/1991 | Duck et al. | 156/273.5 |
| 5,108,526 | 4/1992 | Cornils et al. | 156/108 |
| 5,151,149 | 9/1992 | Swartz | 156/379.8 |
| 5,234,730 | 8/1993 | Lautenschlaeger et al. | 428/34 |
| 5,329,094 | 7/1994 | Murphy et al. | 219/243 |
| 5,331,784 | 7/1994 | Agrawal et al. | 52/393 |
| 5,336,349 | 8/1994 | Cornils et al. | 156/107 |
| 5,421,940 | 6/1995 | Cornils et al. | 156/244.11 |
| 5,433,810 | 7/1995 | Abrams | 156/273.7 |
| 5,440,849 | 8/1995 | Agrawal et al. | 52/393 |
| 5,444,814 | 8/1995 | Hofuis, Sr. | 392/407 |
| 5,456,874 | 10/1995 | Cordes et al. | 264/138 |
| 5,507,994 | 4/1996 | Cornils et al. | 264/252 |
| 5,522,954 | 6/1996 | Bennett et al. | 156/64 |
| 5,554,325 | 9/1996 | Kotte et al. | 264/37 |
| 5,571,461 | 11/1996 | Scholl et al. | 264/40.5 |
| 5,578,153 | 11/1996 | Hill | 156/106 |
| 5,591,528 | 1/1997 | Fisher et al. | 428/411.1 |
| 5,611,180 | 3/1997 | Agrawal et al. | 52/393 |
| 5,614,051 | 3/1997 | Fisher et al. | 156/245 |
| 5,620,648 | 4/1997 | Volkmann et al. | 264/511 |
| 5,628,859 | 5/1997 | Janin et al. | 156/273.3 |
| 5,645,785 | 7/1997 | Corniles et al. | 264/252 |

FOREIGN PATENT DOCUMENTS

| | | |
|---|---|---|
| 371807 | 6/1990 | European Pat. Off. . |
| 585129 | 3/1994 | European Pat. Off. . |
| 603047 | 6/1994 | European Pat. Off. . |
| 2406340 | 10/1974 | Germany . |
| 2352294 | 4/1975 | Germany . |
| 3238651 | 4/1984 | Germany . |
| 843437 | 8/1960 | United Kingdom . |
| 1079446 | 8/1967 | United Kingdom . |

OTHER PUBLICATIONS

Japanese Abstract No. 4,047,090, dated Dec. 17, 1992.
Japanese Abstract No. 3,119,081, dated May 21, 1991.

VEHICLE ASSEMBLY LINE-SIDE HEAT ACTIVATION OF A "READY-TO-INSTALL" WINDOW FIXING ADHESIVE FOR ATTACHMENT OF A VEHICLE WINDOW TO A VEHICLE

TECHNICAL FIELD AND BACKGROUND OF THE INVENTION

This invention relates to vehicle panel assemblies and, more particularly, to vehicle panel assemblies which are mounted to a vehicle with an adhesive.

Conventional window assemblies are mounted to the vehicle body by an adhesive and often in combination with one or more fasteners which are mounted on the window panel or are embedded in a gasket which has been previously extruded or molded on to the window panel. The adhesive often provides the primary attachment to the vehicle and is applied to the surface of the panel, for example by extrusion, after priming of the substrate surface (typically a glass substrate) and/or the vehicle body (typically metal or a composite material). The window assembly is then pressed against the mounting flange or decking of the vehicle body to which the adhesive adheres after curing. Heretofore, these adhesives have been moisture cured, for example the moisture cure BETASEAL brand adhesive available from Essex Specialty Products of Auburn Hills, Mich. These moisture cure urethane adhesives, however, are currently applied at the vehicle assembly line and require either robotic application or hand application. Furthermore, the moisture cure adhesives require relatively long cure times—these adhesives typically take on the order of 120 minutes to cure sufficiently to develop the required "decking" strength to hold the window assembly in place. Consequently, the window assemblies installed in this manner may require temporary support while moving along the assembly line. Furthermore, the full strength of the adhesive requires a cure of about 24 to 72 hours, depending on environmental conditions. In addition, these cure periods are sensitive to the surrounding environment. Where the manufacturing plant is located in an area having low humidity, the cure time is significantly longer than in an area having high humidity. Consequently, standardizing such installations is difficult.

In addition to the relatively long cure time, the chemicals forming the adhesive and the adhesive primers require special handling. The adhesive must be contained in a very low moisture or moisture-free environment before application onto the glass panel to avoid premature curing. Furthermore, the adhesive and primer chemicals require special clean-up procedures and inventorying to assure full effectiveness of the adhesive. Moreover, these chemicals require proper ventilation, and the personnel handling the chemicals require protective gear. Consequently, in-vehicle-plant applications are labor intensive, increase assembly linetime, potentially increase the frequency of down-time when the adhesive is improperly applied, for example when the adhesive is dripped on other areas of the vehicle, and are, therefore, costly.

More recently, proposals have been made to control the curing process of the adhesive by covering the adhesive with a barrier film which is then subsequently peeled off the bead at the assembly line to allow installation and curing. One such example is disclosed in U.S. Pat. No. 4,933,032 to Kunert. Kunert '032 also proposes the use of heat or irradiation to actuate a multi-component polyurethane adhesive, which contains an initiating or reaction component in inactivated form, for example in the form of micro-capsules, which are activated by the heat or irradiation before assembly of the glazing. While the removable barrier films and multi-component polyurethane adhesive theoretically remove the adhesive application process from the assembly line, numerous problems still remain. The extrusion and film application process is complicated, and the film can be vulnerable to tearing or damage during transportation. Furthermore, these films still require removal and disposal. Moreover, the barrier film must be accurately placed, otherwise, the exposed portions of the adhesive are prematurely cured and may be ineffective as a bonding agent.

The recent trend in vehicles is to produce a stream line or aerodynamic vehicle with larger windows to improve visibility. As a result the window assemblies often require compound curvatures. These compound curvatures make it hard to heat the panel uniformly. Furthermore, newer window panels include laminated substrates, moldings, and attachments which tend to degrade when subject to high temperatures. In order to heat such micro-capsule-containing adhesives over a period of time consistent with in-line processing, relatively high energy is required. In addition to possible degradation of the panel substrate, of the moldings, and of the attachments, the bead of adhesive is also subject to degradation if overheated. Perhaps for these and other reasons, heretofore, no "ready-to-install" window or panel assemblies have been successfully made or commercialized.

Consequently, there is a need for a "ready to install" panel assembly, for example a modular window, which can be quickly installed or "decked" in a vehicle or the like in an assembly line. Preferably, the modular window can be preassembled with an adhesive already applied at a location remote from a vehicle assembly plant to eliminate additional manufacturing time at the assembly line, handling of extra materials, on-line purging, which is required to eliminate unused portions of the moisture cured urethane in the dispenser nozzle, handling of chemistry in the vehicle manufacturing plant, including the adhesives and adhesive primers, and humidity control equipment and yet can be "decked" with the adhesive which is not activated until just prior to installation and which develops sufficient decking strength to hold the modular window in place.

SUMMARY OF THE INVENTION

Accordingly, the present invention provides a method of heating a vehicle panel which includes first and second opposing spaced apart surfaces and a bead of heat activated adhesive on the second surface of the panel. Preferably, the panel is heated by applying shortwave and longwave infrared radiation, with the shortwave infrared radiation being applied to the first surface of the panel to heat the panel and, thereby, indirectly heat the bead of the heat activated adhesive. The longwave infrared radiation is applied to the second surface of the panel to directly heat the bead and to activate the adhesive.

In preferred forms, the shortwave infrared radiation has a peak emission in the range of less than about 2.5 microns. More preferably, the shortwave infrared radiation has a peak emission at a range of about 0.6 to 2.5 microns. Most preferably, the shortwave infrared radiation has a peak emission of less than about 1.0 micron. The longwave infrared radiation preferably has a peak emission greater than about 2.5 microns. More preferably, the longwave infrared radiation has a peak emission in a range of about 2.5 to 8.0 microns.

In one form, the bead is heated to an activation temperature at its core while avoiding degradation at its surface, for example a core temperature in range from about 50° Celsius (C.) to 160° C. Preferably, the bead core is heated to a temperature in a range of about 70° C. to 120° C. Most preferably, the core of the bead of adhesive is heated to a temperature in a range of about 80° C. to 110° C. In addition, the shortwave infrared radiation and longwave infrared radiation are balanced to avoid degradation of the bead material at the bead's outer extremity. Desirably, the skin or outer surface temperature should not exceed the temperature of the core more than about 40° C., more preferably more than about 20° C., and most preferably more than about 10° C. For example, the bead surface temperature is preferably maintained at a bead surface temperature of less than about 170° C., more preferably less than about 140° C., and most preferably less than about 120° C.

In order to avoid degradation of the adhesive and yet provide uniform heating, the shortwave and longwave infrared radiation is applied for less than about twenty minutes and, more preferably, less than about ten minutes. Most preferably, the shortwave and longwave infrared radiation is applied for less than about five minutes, such as for less than about two minutes.

In another form, the panel is supported on a conveyor. The conveyor indexes the panel between assembly stages. The shortwave infrared radiation and longwave infrared radiation may be applied in at least two heating stages, with each of the heating stages corresponding to one of the assembly stages so that the heating cycle is compatible with the indexing of the conveyor and, therefore, the panel can be heated while on the conveyor.

In other forms, the longwave infrared radiation is localized onto the bead, for example, by providing a perimeter heater which emits longwave infrared radiation along a perimeter of the panel which corresponds to the location of the bead. Optionally, the longwave infrared radiation can be localized, for example, by directing the infrared radiation on to the bead or by shielding a central portion of the vehicle panel. In other forms, the shortwave infrared radiation is localized onto a portion of the second surface of the panel which is aligned with the bead. Thus, the remaining portion of the panel is protected from the shortwave infrared radiation to avoid or eliminate degradation of the panel substrate and other components which may be molded onto the panel. For example, the shortwave infrared radiation may be localized by directing the shortwave infrared radiation by interposing a heat director between the vehicle panel and the source of shortwave infrared radiation to direct the radiation away from and protect the balance of the panel and any heat sensitive components. In another form, a shield may be interposed between the vehicle panel and the source of shortwave infrared radiation which shields or masks the central and, optionally, the peripheral portion of the panel. Optionally, the heat from the longwave and shortwave infrared radiation are both localized. For example, shields may be positioned on both sides of the panel. Furthermore, both sides of the panel may be heated with shortwave infrared radiation or both sides may be heated with longwave infrared radiation. Moreover, the adhesive free side of the panel may be heated with longwave infrared radiation, and the adhesive bearing side of the panel may be heated with shortwave infrared radiation.

According to another aspect of the invention, an apparatus for heating a vehicle panel, which has first and second opposed spaced apart surfaces and a bead of heat activated adhesive, i.e., an adhesive that is heat activatable to a form suitable for use as a window fixing adhesive for vehicles, applied to the second surface, includes a first heating component and a second heating component. The first heating component is adapted to heat the first side of the panel for indirectly heating the bead of adhesive. The second heating component is adapted to directly heat the bead of adhesive with the heat being localized on the bead of adhesive.

In one form, the first heating component includes a source of shortwave infrared radiation for heating the first side of the vehicle panel. For example, the source of shortwave infrared radiation may comprise at least one lamp, including a quartz lamp having a tungsten filament for generating the shortwave infrared radiation. Preferably, the first heating component includes a plurality of lamps, which may be arranged in a spaced, parallel relationship to the glass to direct radiation substantially perpendicular to the panel surface. Where the panel is curved, i.e. such as a panel having a compound curvature, the first heating component may be shaped or contoured or arranged so as to generally follow the shape and/or contour of the curved panel. The second heating component preferably includes a source, such as a fused quartz emitter, for emitting the longwave infrared radiation. The fused quartz emitter includes a fused quartz substrate and an electrical element embedded in the fused quartz substrate. Preferably, the second heating component includes a plurality of heater sections, which are arranged to align with the bead on the panel. In this manner, the longwave infrared radiation is primarily directed to the bead of the heat activated adhesive. Where the bead of adhesive is positioned on a perimeter portion of the panel, the heater sections are preferably arranged as a perimeter heater for aligning with the bead of adhesive.

In yet another aspect of the invention, an apparatus for heating a vehicle panel supported on a conveyor, which indexes the panel between a plurality of heating stages, includes a first heater, which is adapted to heat the panel during a first heating stage, and a second heater, which is adapted to heat the panel during a second heating stage. The first heater includes a first heating component and a second heating component, and the second heater includes a third heating component and a fourth heating component. Each of the first heating component and third heating component has a source of shortwave infrared radiation and is adapted to heat a first side of the panel for indirectly heating a bead of adhesive which is provided on the second side of the panel. Each of the second heating component and fourth heating component includes a source of longwave infrared radiation and is adapted to apply the longwave infrared radiation onto the second side of the panel to directly heat the bead.

In one form, each of the first and third heating components is adapted to move from a heating position, for heating the panel and the bead, to a holding or non-heating position. In further aspects, each of the first and third heating components supports a shield, with each of the shields having an opening, which is adapted to direct shortwave infrared radiation onto a portion of the first side of the panel opposed from the bead for heating the panel to indirectly heat the bead of adhesive.

In yet another form, the apparatus further includes third and fourth heaters. The third and fourth heaters define third and fourth heating stages, respectively, with each including a shortwave infrared radiation source for heating the first side of the panel and a longwave infrared radiation source for heating the second side of the panel and directly heating the bead. In other forms, additional heating stages beyond the fourth heating stage can be added.

The improved apparatus and method disclosed herein provides a "ready-to-install" panel assembly, which is particularly suitable for window assemblies. The panel assembly is pre-assembled with a bead of heat activated adhesive extruded or otherwise applied on a second side of the panel substrate. The bead of adhesive is activated by the application of longwave and shortwave infrared radiation which are respectively applied to the bead of adhesive and to an opposed side of the panel substrate, which indirectly heats the bead. The panel substrate and other components, such as molded gaskets and the like, are protected from the shortwave infrared radiation by localizing the shortwave infrared radiation on a discrete portion of the first side of the substrate panel which is aligned with the bead of adhesive. In this manner, the bead of adhesive is quickly and uniformly heated without the associated degradation which often occurs with high energy heating.

DESCRIPTION OF THE PREFERRED EMBODIMENTS

Referring to FIGS. 1, 2, 2A and 2B, a panel assembly 10, for example a modular window assembly, which is heated by the apparatus and method of the present invention includes a substrate panel or sheet 12, which may comprise plastic or glass, preferably substantially transparent glass, for example tempered, laminated, or glass which is otherwise strengthened using conventional techniques. Furthermore, panel 12 may comprise a multi-laminate panel, for example, of plastic and glass sheets. In addition, panel 12 may comprise a large window, such as a window having a surface area of at least about 250 square inches or such as a window with a surface area of at least about 500 square inches. Optionally, panel 12 may be a curved panel (such as a curved panel having a compound curvature) with a concave surface on which is disposed the ready-to-install adhesive and on which are disposed other heat vulnerable attachments, such as polymeric gaskets, studs, bezels, and the like. Alternately, panel assembly 10 can be a decorative assembly with panel 12 being translucent or opaque instead of transparent. Panel 12 has two substantially parallel sides or surfaces 14 and 16 and a peripheral edge 18. Panel 12 may include an opaque, preferably black, frit layer which extends around peripheral edge 18 and, optionally, is encapsulated with a molded member, for example a polymeric gasket 20 on at least one side 14 or 16 of panel 12.

In the illustrated embodiment, panel 12 includes a three sided polymeric gasket molded thereon. Thus, gasket 20 extends around three (3) sides of panel 12, namely, surfaces 14, 16 and edge 18. It should also be understood that panel 12 may be free of any gasket or may include a single sided or two sided gasket. Gasket 20 may be formed using a variety of techniques, including reaction injection molding (RIM) of thermosetting polymeric material, such as polyurethane, or a thermoplastic polymeric material which, for example, is injection molded such as polyvinyl chloride (PVC), a thermoplastic urethane, or a thermoplastic elastomer (including an ethylene-styrene interpolymer formed from a melt-processible, low halogen free polymer resin material, such as a resin based on polyolefin and produced using a metallocene catalyst and having a durometer within a range of about 30 to 110 on the Shore A scale, more preferably about 65 to 95 Shore A, and most preferably 65 to 85 Shore A, for example, one preferred form of an ethylene-styrene interpolymer is available from DOW Chemical, Freeport, Tex., and which, preferably, utilizes DOW's INSITE™ single-catalyst technology, wherein depending on the amount of styrene incorporated, the solid state of the polymer can exhibit a variety of structures and durometer hardnesses, including semi-crystalline and amorphous rubber such as described in pending U.S. patent application entitled VEHICULAR WINDOW ASSEMBLY, Serial No. 09/005, 487 filed on January 12, 1998by Qihua Xu and David E. Nestell and assigned to Donnelly Corp. of Holland, Mich., the disclosure of which is incorporated herein by reference in its entirety), and other applications, such as extrusion or post attachment grommets. In addition, gasket 20 may include one or more fasteners (not shown) embedded in the gasket or secured to the panel adjacent the gasket for securing components to panel assembly 10 or securing panel assembly 10 to the vehicle or the like.

Figure 2:
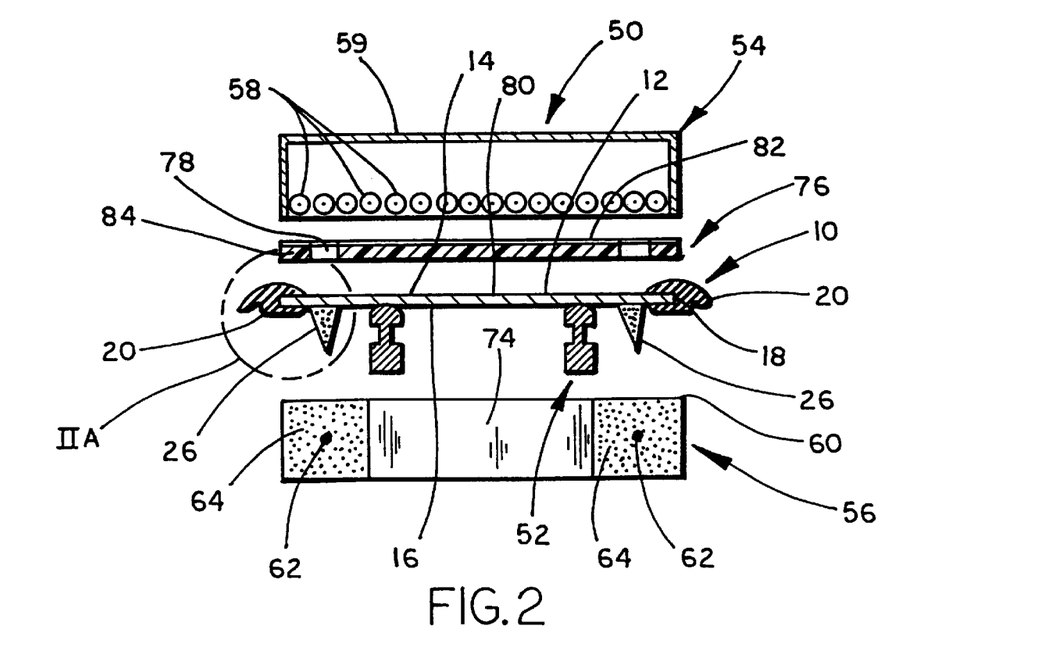
FIG. 2 is a cross-section of the heater assembly taken along line II—II of FIG. 1 including a first embodiment of a heat localizer.
Figures 2A, 2B:
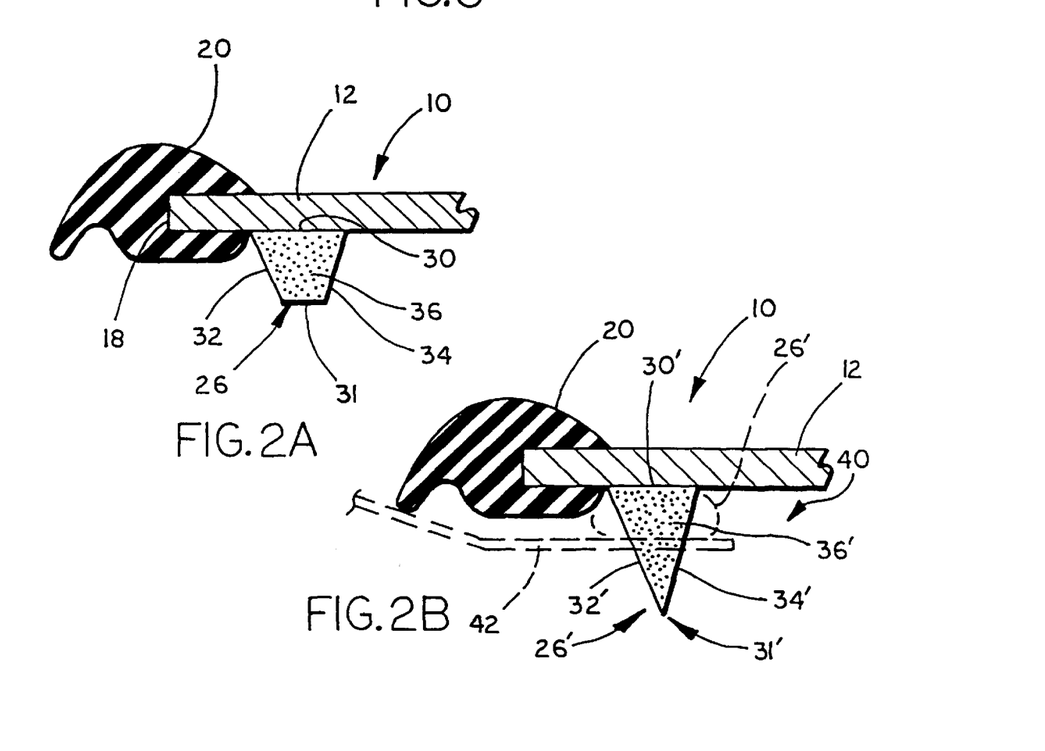
FIG. 2A is an enlarged fragmentary view of a peripheral portion of one of the panel assemblies to be heated.
FIG. 2B is an enlarged fragmentary view similar to FIG. 2A illustrating the panel assembly installed in an opening of a vehicle.

Referring to FIG. 2A, a bead 26 of a heat activated adhesive is extruded or otherwise applied, including post-applied, onto the peripheral portion of the inside surface 16 of panel 18. In the illustrated embodiment, bead 26 includes a generally quadrilateral-shaped cross section with a wide base 30 defining an interface portion or region and a side 31 defining a generally outer extremity portion or region, which is formed by converging sides 32 and 34 such as shown in FIG. 2A. Sides 31, 32 and 34 define a bead skin or outer surface portion or region. Intermediate sides 31, 32 and 34 and base 30 is a central portion or region or core 36. It should be noted that bead 26 may also be dispensed or otherwise applied on a gasketed portion of panel 12 and may assume other shapes, with the apparatus and method of this invention being equally suitable for activating the adhesive bead in either position.

Adhesive bead 26 is preferably extruded or otherwise applied onto panel 12 at a "just-in-time" plant close to but a distance from the vehicle production plant for a "ready-to-install" and/or "sequenced" installation. Consequently, when panel assembly 10 is transported, panel assembly 10 is preferably transported with the adhesive bead positioned or orientated face down so that adhesive bead 26 will be protected by substrate panel 12 during transportation. When delivered to the vehicle assembly plant, panel assembly 10 is heated by a heater assembly 50. As best seen in FIG. 2B, a second embodiment 26' of heat activated adhesive bead is shown. Bead 26' includes a generally triangular-shaped cross section with a wide base 30' defining an interface portion or region and a generally pointed outer extremity portion or region 31', which is formed by converging sides 32' and 34'. Outer extremity 31' and sides 32' and 34' define a bead skin or outer surface portion or region of bead 26', with a central core portion 36' being defined between sides 32' and 34' and between outer extremity 31' and interface portion 30'. After heating, panel assembly 10 is installed in an opening 40 of a vehicle, and adhesive bead 26' is compressed against a mounting flange or deck 42, which extends around opening 40 to adhere panel assembly 10 to the vehicle body, with the adhesive characteristics of adhesive bead 26' having been activated by the heater assembly 50 and method of heating, each of which will be more fully described below.

Figure 1:
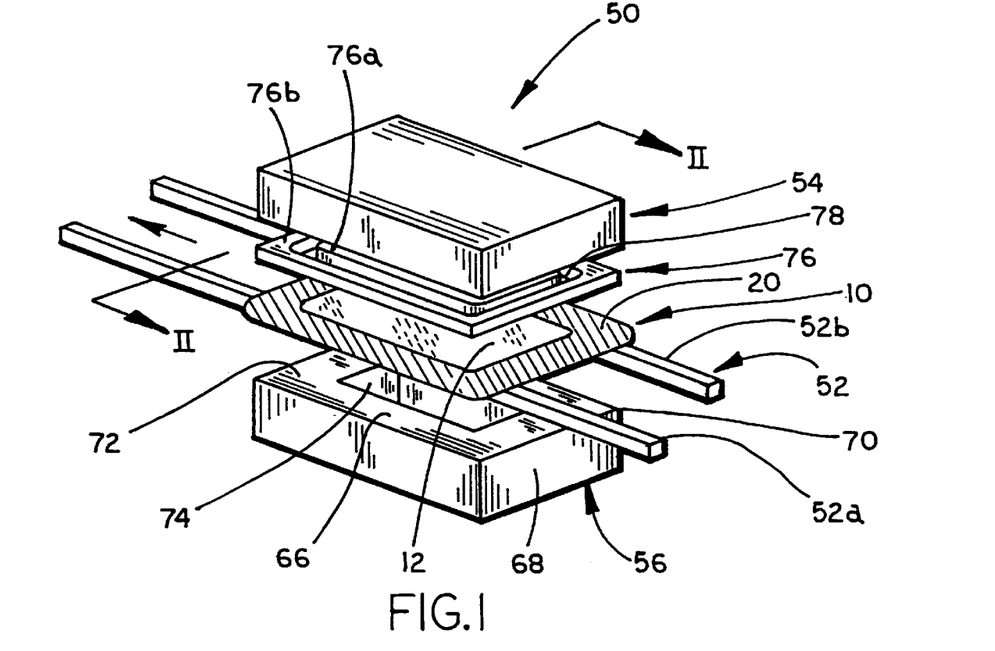
FIG. 1 is a perspective schematic view of a heater assembly of the present invention positioned along a conveyor which transports panel assemblies to be heated.

Referring to FIG. 1, heater assembly 50 of the present invention is shown positioned along a conveyor 52 which transports panel assemblies 10 for installation in a vehicle or the like. Conveyor 52 is of conventional design and includes spaced apart conveyor belts or chains 52a and 52b, which support panel assemblies 10 inwardly of their respective outer edges. Conveyor belts 52a and 52b are driven by a conventional drive system (not shown) as would be understood by those skilled in the art. Heater assembly 50 includes a first or upper heating component 54 and a second or lower heating component 56 which are positioned on opposed sides of panel assembly 10 and conveyor belts 52a and 52b. Heating component 54 is positioned above panel assembly 10 for heating surface 14, the adhesive-free side of panel 12 and is, preferably, adapted to heat a perimeter portion of surface 14 of panel 12 which corresponds and is aligned with bead 26 or 26'. Heating component 56, on the other hand, is positioned below panel assembly 10 and conveyor belts 52a and 52b and is adapted to heat side 16 and, more specifically, to heat bead 26 or 26'.

Heating component 54 provides heat energy to side or surface 14 of panel assembly 10 and preferably includes a shortwave infrared radiation source such as a plurality of shortwave infrared emitting lamps 58 (FIG. 2), for example the high density tubular quartz (T3) tungsten filament lamps which are available from Research, Inc. of Minneapolis, Minn. Lamps 58 preferably emit peak radiation of less than about 2.5 microns. More preferably, lamps 58 emit a peak radiation in about the 0.6 to 2.5 micron region of the infrared spectrum. More preferably, lamps 58 emit peak radiation of less than about 1.0 micron. In the illustrated embodiment, lamps 58 are preferably supported in a housing 59 and are arranged in a generally parallel spaced apart relationship to the panel assembly 10. In addition, lamps 58 are preferably equally spaced to provide a uniform application of heat to the perimeter portion of substrate panel 12. Alternately, lamps 58 may be arranged in a non-uniform manner to accommodate the topology of the panel assembly, for example a curved panel assembly, including a curved panel assembly with a compound curve. Furthermore, lamps 58 are preferably removably mounted in housing 59 and can be reconfigured and rearranged in housing 59 to accommodate variations in the shape and size of the panel assemblies.

In contrast, second heating component 56, which provides heat energy to bead 26 or 26', preferably comprises a longwave infrared heater and includes a longwave infrared radiation source, such as a quartz emitter 60 (FIG. 2). Quartz emitter 60 preferably emits a peak radiation greater than about 2.5 microns in the infrared spectrum. More preferably, second heating component 56 emits a peak radiation in a range of about 2.5 to 8.0 microns. Most preferably, second heating component 58 emits peak radiation in a range of about 2.5 to 6.0 microns. Quartz emitter 60 includes one or more heating elements 62 which are embedded in a fused quartz medium or substrate 64 and is commercially available from Casso Solar of Pomona, N.Y. Alternately, heating component 56 may apply hot air to panel 16 and bead 26 or 26' to heat bead 26 or 26'. Preferably, the hot air is directed onto the bead, with the central portion of the panel 16 and heat sensitive attachments avoiding degradation. In another form, heating component 56 may comprise a black body radiator that emits infrared radiation in response to the shortwave infrared radiation emitted by lamps 58. For example, heating component 56 may comprise a fused quartz body which would emit longwave infrared radiation.

In the illustrated embodiment, heating component 56 preferably comprises a perimeter heater, as shown in FIG. 1, having heat emitting portions or sections 66, 68, 70, and 72 which are aligned with adhesive bead 26 on panel 12 and, preferably, includes a non-heat emitting central portion or opening 74 so that the heat which is emitted from second heating component 56 is substantially localized at the adhesive bead 26 rather than the entire panel assembly 10. Alternately, heating component 56 may be provided with a heat director, such as a heat shield which localizes the heat on bead 26 and is adapted to shield or mask the central portion 80 and molded gasket 20 to protect substrate panel 12 and molded member 20 from degradation.

As described above, first heating component 54 is positioned above panel assembly 10 so that the heat emitted from lamps 58 is directed to the adhesive-free-side of panel 12. Furthermore, in order to localize the heat from lamps 58 onto the portion of surface 14 of panel 12 which corresponds to or is aligned with adhesive bead 26, heater assembly 10 further preferably includes a heat localizer, for example a heat shield 76. Heat localizer 76 is interposed between first heating component 54 and panel assembly 10 and includes a perimeter opening 78 which corresponds to the perimeter portion of upper surface 14 corresponding to and aligning with bead 26. In this manner, the heat from lamps 58 is localized on the glass side of bead 26, and the heat sensitive components, such as molded member 20 which tend to degrade under high temperatures such as those associated with activation of adhesive 26, are shielded from the shortwave infrared radiation emitted from lamps 58. In addition, heat shield 76 shields or masks the central portion 80 of panel 12 to avoid introduction of cracks and delamination. Furthermore, by shielding or masking the central portion of panel, panel assembly 10 is easier to handle.

Referring to FIG. 2, heat shield 76 includes a reflective surface 82 to direct the heat away from molding 20 and central portion 80 of panel assembly 10. For example, reflective surface element 82 may comprise a polished metal sheet backed with an insulating substrate 84, which together minimize the amount of heat transmitted from first heating component 54 to molded member 20 and central portion 80 of panel assembly 10. In addition, heat shield 76 may include an air gap between reflective surface element 82 and plastic substrate 84 which increases the dissipation of heat and, therefore, improves the shielding of the respective heat sensitive components of panel assembly 10. Alternately, heat shield 76 may comprise a ceramic or a metal coated or reflector clad ceramic. Furthermore, shield 76 may comprise a double pane shield, for example an aluminum double pane with preferably, a gaseous layer, such as of air or an inert gas, such as argon or nitrogen or the like, or an insulating material, such as fiberglass or xerogel or the like, between the panes serving as an insulator. Moreover, shield 76 may be substantially opaque or may be only partially opaque so as to, optionally, provide restricted heating of the shielded window panel region (so as to avoid thermal differences between the shielded region and the perimeter unshielded region and, thus, alleviate thermal stresses). For example, shield 76 can comprise a panel (such as of a specialized near infrared absorbing glass) that is only partially transmitting to shortwave infrared radiation (for example, is less than 50% transmitting). Also, shield 76 can have a gradient in its thermal transmission property with its outer edge regions being, preferably, substantially opaque and its more central regions being less opaque, i.e. more partially opaque. Thus, shield 76 can be a gradient heat shield that heats the central window panel regions least (distal from the panel edge region where the bead 26 is generally disposed) and that heats the window panel more at the edge regions closer where the bead 26 is disposed. Such a gradient heat shield can obviate thermal stresses between the shielded and unshielded regions of the window panel, while providing adequate heat shielding to protect any heat vulnerable attachments to the window panel, or protect any laminating materials used. For example, shield 76 can comprise a near infrared radiation absorbing glass panel that transmits less than about 10% of incident shortwave infrared radiation at its center regions, but that transmits greater than about 70% incident shortwave infrared radiation at its edge regions, thus acting as a gradient heat shield for the window panel. Furthermore, the outer perimeter portion 76b of the shield may have a higher shielding efficiency than central portion 76a. In this manner, the thermal gradient across panel 10 may be balanced to control the thermal stresses in the panel due to the localized heating.

Preferably, shield 76 is supported by housing 59 of first heating component 54, for example by conventional fasteners and the like, with the central portion 76a being supported independently from the perimeter portion 76b of shield 76 to assure that opening 78 remains unobstructed.

Figure 2C:
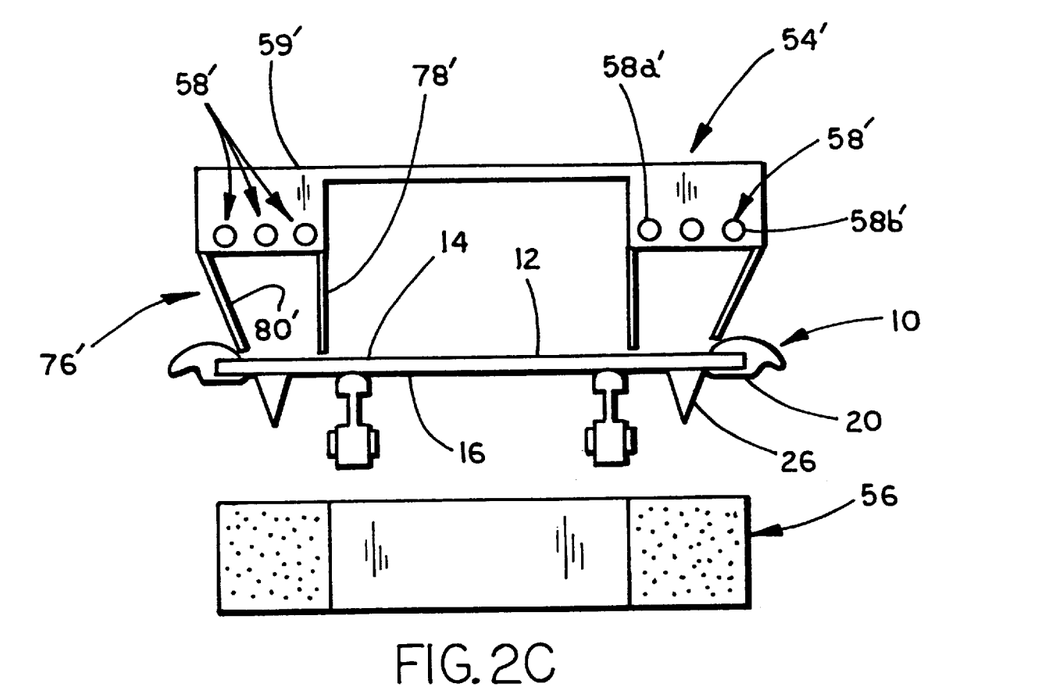
FIG. 2C is a cross-section similar to FIG. 2 illustrating a second embodiment of a heat localizer.

Referring to FIG. 2C, a second embodiment of heating component 54' and heat localizer 76' are shown. Heating component 54' comprises a perimeter shortwave heater and includes lamps 58', which are arranged to form a perimeter heater such that lamps 58' are generally aligned over the portion of upper side 14 of panel assembly 10 which is aligned with bead 26. Heat localizer or director 76' includes an inner heat directing member 78' and an outer heat directing member 80' which are aligned to direct the heat from lamps 58' onto the localized or discrete peripheral portion of the upper side 14 of panel assembly 10 which is aligned with bead 26. Inner heat directing member 78' is preferably supported on housing 59' inwardly of the innermost lamp 58a'. Outer heat directing member 80', on the other hand, is supported on housing 59' outwardly of outermost lamp 58b' so that substantially all the infrared radiation emitted from lamps 58' is directed between inner and outer heat directing members. Preferably, outer heat directing member 80' is canted or slanted inwardly so that the heat from lamps 58' is localized or focused on that portion of the upper side 14 of panel assembly 10. Optionally, heat localizer or director 76' may include intermediate heat directors (not shown) which extend from housing 59' between inner and outer heat directors 78' and 80'. In this manner, increased control over the applied heat may be obtained when lamps 58' are individually controlled. Furthermore, heat director members 78' and 80' may comprise annular members or, optionally, may each comprise a plurality of overlapping segmented members, whose position or orientation can be adjusted by varying the degree of overlap between each of the individual segmented members.

It can be appreciated from the foregoing that the shortwave infrared radiation emitted from lamps 58 heats a localized or a discrete portion of substrate panel 12, which in effect becomes a heat source for bead 26, and heats bead 26 through interface surface 30 between panel 16 and bead 26. On the other hand, the longwave infrared radiation emitted from heater assembly 56 directly heats bead 26 and, more specifically, heats outer skin surfaces 32, 34 and outer extremity portion 31 of adhesive bead 26. Together, shortwave heating component 54 and longwave heating component 56 uniformly heat adhesive bead 26 so that its central core portion 36 achieves the desired temperature without over heating the skin or outer surface portion and, more significantly, its outermost extremity portion. It should be understood from the foregoing that the geometry of bead 26 may result in bead 26 having at least three temperatures—for example, a bead core temperature, a bead skin surface temperature, and a bead interface temperature. Depending on the balance of the shortwave and longwave infrared radiation, these three temperatures may vary considerably. Desirably, in order to activate the adhesive properties of bead 26, the core portion 36 is heated sufficiently to at least its minimum activation temperature while the interface and outer skin surface temperatures are preferably maintained below the adhesive degradation temperature.

Preferably, adhesive bead 26 comprises a heat activated adhesive which has a minimum activation temperature of at least about 50° to 60° C. to provide a safety margin against unintentional activation, such as during shipment from a remote ready-to-install window facility to a vehicle assembly plant. More preferably, adhesive bead 26 has a minimum activation temperature of at least about 80° C., and even more preferably has a minimum heat activation temperature of less than about 120° C. Most preferably, adhesive bead 26 has a minimum heat activation temperature in a range of about 80° C. to 110° C. For example, however, where the window panel is such as a laminated windshield or side window or backlite comprising two glass sheets laminated with a polymer inner layer, such as plasticized polyvinyl butyral, or silicone or the like, it is preferable that the activation temperature of the adhesive be less than or equal to about 125° C., more preferably less than or equal to about 150° C., and most preferably less than or equal to about 105° C. Also, when a ready-to-install adhesive is applied on or adjacent to a gasket such as a polyvinyl chloride (PVC) molding, a urethane molding, an elastomeric molding or the like, it is preferable that the heat activation temperature of the adhesive be about less than or equal to 125° C., more preferably less than or equal to about 115° C., and most preferably less than or equal to about 105° C. In addition, the adhesive bead 26 preferably has a maximum activation temperature less than about 160° C., more preferably, less than about 130° C., and most preferably less than about 120° C. When activated, the core temperature of adhesive bead 25 is, preferably, in a range of about 50° to 160°, more preferably in a range of about 70° to 120° C., and most preferably in a range of about 80° to 110° C. In order to control and, more preferably, eliminate degradation of the bead material, the shortwave and longwave infrared heaters are controlled and/or balanced so that the bead skin surface temperature at the bead's skin or outer surface portion or region and/or at least a portion of the bead's skin or outer surface portion, does not exceed the temperature of the central core portion of the bead more than about 40° C., more preferably, more than about 20° C., and most preferably more than about 10° C. For example, the bead surface temperature is preferably maintained less than about 170° C., more preferably less than about 140° C., and most preferably less than about 120° C. While no maximum dwell times are required, in order to provide a process suitable for coordination with production line assembly, heater 50 preferably heats bead 26 to its activation temperature in less than about ten minutes, more preferably, in less than about five minutes, and most preferably, in less than about two minutes. In some applications, heater 50 may heat bead 26 to its activation temperature in a range of about 5 seconds to about 20 seconds, provided that the core of bead 26 reaches its desired activation temperature and is uniformly heated.

A preferred heat activated adhesive preferably comprises an adhesive forming resin such as urethane resin, polyether resin, acrylic resin, oxyalkylene resin, vinyl resin, or a similar adhesive forming resin. The adhesive may include latent accelerants and/or catalysts (such as organo metallic catalysts such as tin catalysts) and the like that are heat activated at line-side and/or are formed when exposed to heat above a suitable threshold temperature, including for example monomeric or oligomeric or partially polymerized precursors of window fixing adhesives, such as of urethane, polyether, oxyalkylene, acrylic, vinyl adhesives and the like. Such latent accelerants and/or catalysts can be microencapsulated or can be formed through the heat activation of the adhesive composition. Once so activated, the window fixing adhesive is suitable for securing panel assembly 10 to the vehicle. More preferably, the ready-to-install adhesive is an activatable resin composition, for example, an oxyalkylene polymer having in its structure at least one silicon-containing group which bears a hydroxyl or hydrolyzable group bonded to the silicon atom and which can cross-link through the condensation of silanol. Preferably, the resin further includes carbon black and an oxyalkylene polymer free from any cross-linking group as well as latent accelerants and/or catalysts, stabilizers and the like. In such manner, the ready-to-install heat activated adhesive is preferably not activated until panel assembly 10 is line-side, and is dispensed onto the panel at the remote RTI window plant, and shipped to the vehicle assembly plant, in an uncured or only partially cured and/or in an unformed or only partially formed state.

Figure 3A:
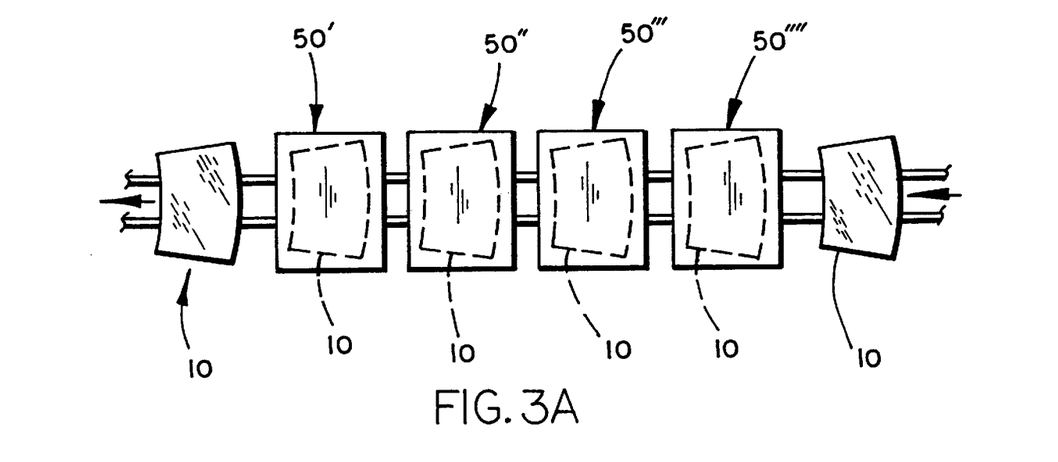
FIG. 3A is a plan view of a multi-stage heater assembly arrangement of the present invention aligned along an assembly line conveyor.
Figure 3B:
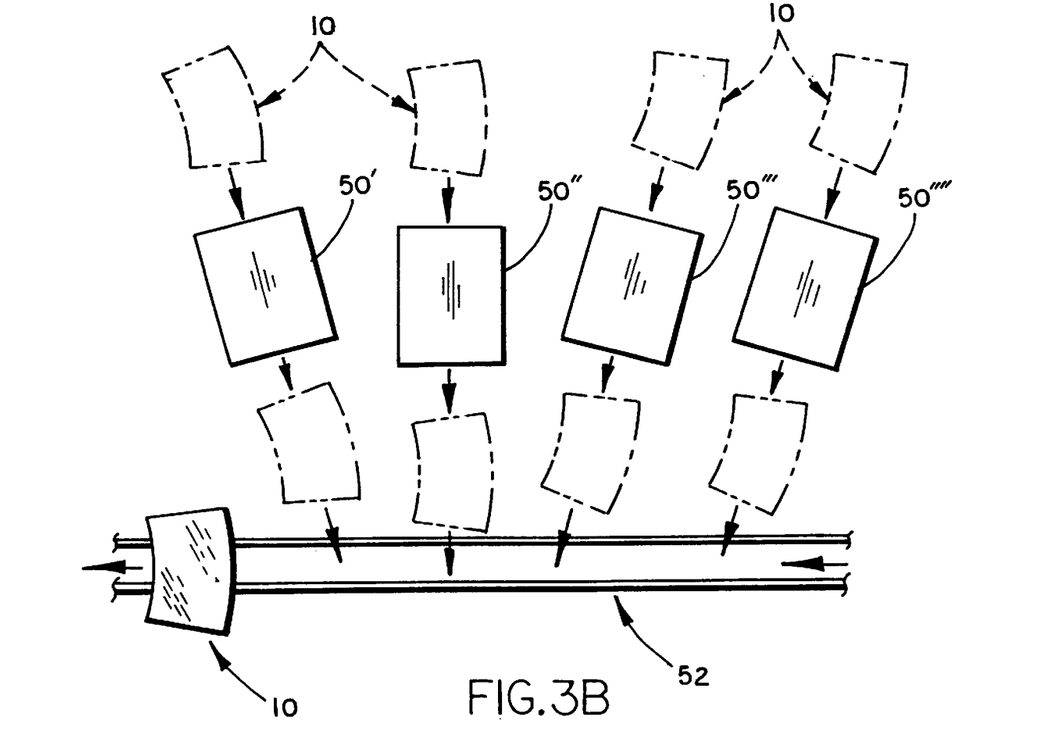
FIG. 3B is a plan view of a second embodiment of a multi-stage heater arrangement of the present invention positioned adjacent an assembly line conveyor.

As shown in FIG. 3A, in order to accommodate the conveyor speed, multiple heating stages having first, second, third, and fourth stage heaters 50', 50", 50'", and 50'''' arranged in series can be used in which adhesive bead 26 is heated, for example in thirty to sixty second stages until the final temperature has been reached. Heaters 50'–50'''' are preferably of similar construction to heater assembly 50 and, therefore, reference is made to that assembly for further details of each heater 50', 50", 50'" or 50''''. The heating times and durations vary depending on the type of substrate panel whether glass and/or whether tempered or laminated, due to the differences in thermal conduction. Alternatively, as best seen in FIG. 3B, first, second, third, and fourth heaters 50', 50", 50'", and 50'''' may be positioned adjacent conveyor 52. In this arrangement, panel assemblies 10 are delivered to heaters 50', 50", 50'", and 50'''' and, after heating, are moved from heaters 50', 50", 50'", and 50'''' for placement on conveyor 52. In this arrangement, panel assemblies 10 are inserted in the respective heaters 50', 50", 50'", and 50'''' at different and successive times so as to allow sufficient dwell times for each assembly so that heated assemblies are available when needed as successive vehicles pass along the assembly line. Thus, in contrast to the heaters arranged in series over conveyor 52, stage heaters 50', 50", 50'", and 50'''' preferably operate out of phase so that when a panel assembly 10 is heated to its activation temperature, the panel assembly may be removed from the respective heater and immediately placed on conveyor 52 without delay for subsequent installation into a vehicle. For example, where conveyor indexes every 60 seconds, stage heaters 50', 50", 50'", and 50'''' would preferably operate out of phase by 60 seconds.

Figure 4:
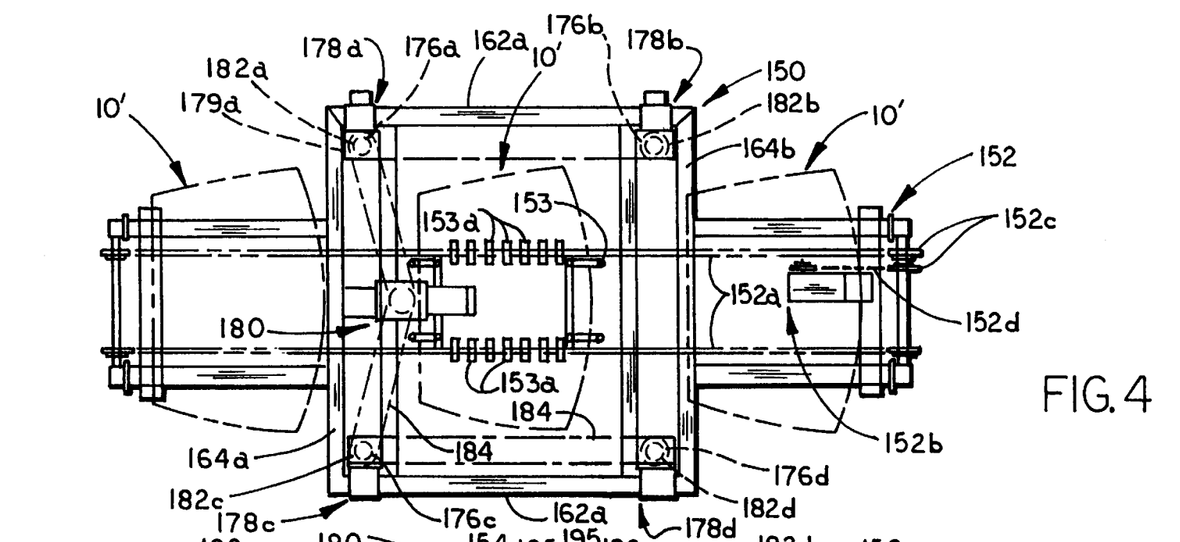
FIG. 4 is a plan view of a preferred embodiment of the heater assembly of present invention positioned in-line for heating panel assemblies transported on a conveyor.
Figure 5:
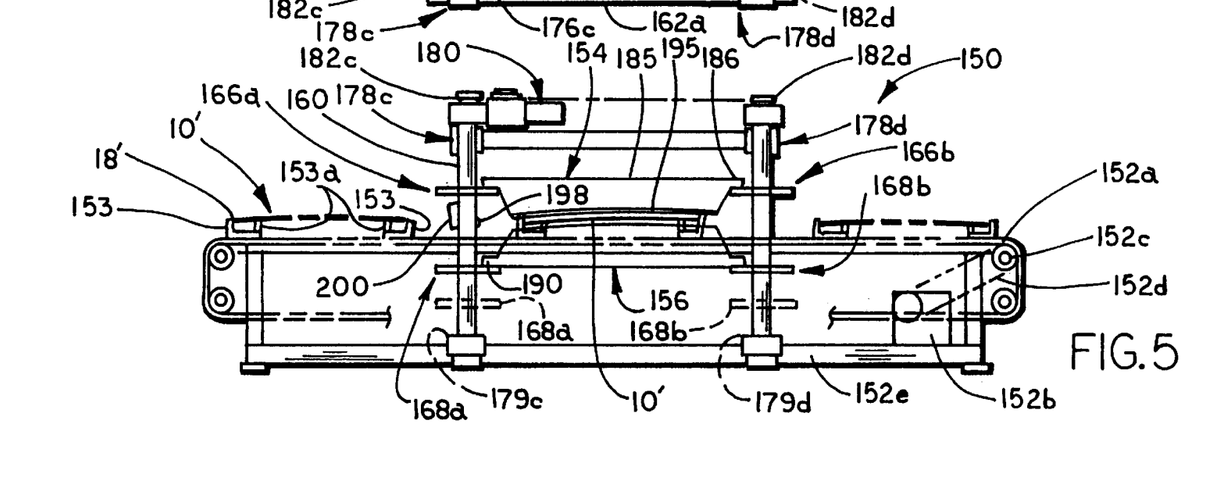
FIG. 5 is a side elevation of the preferred heater assembly of FIG. 4.
Figure 6:
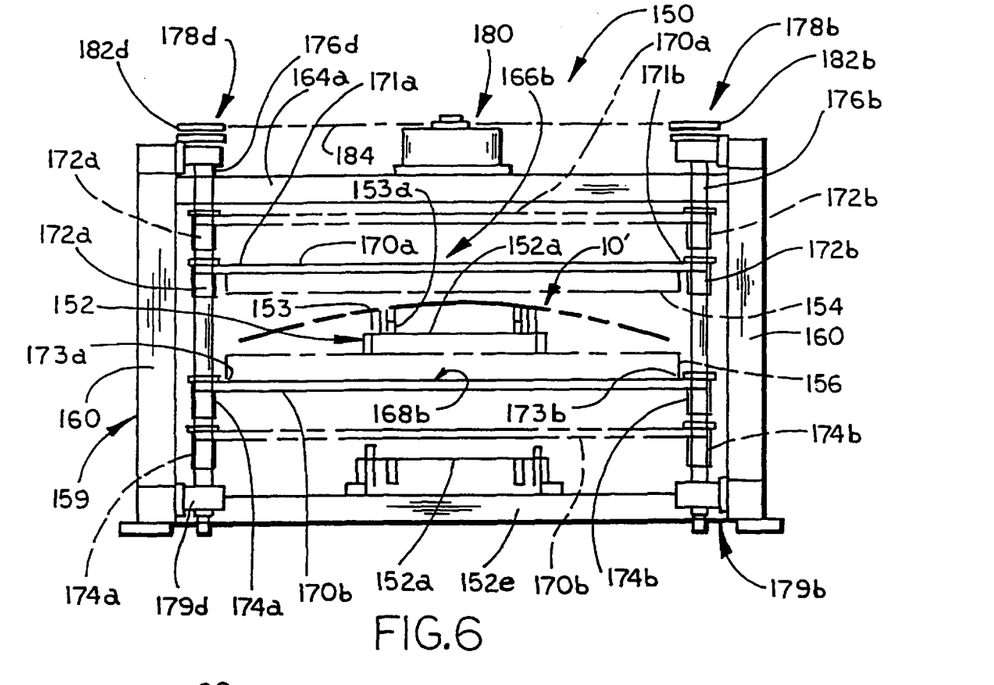
FIG. 6 is end elevation of the preferred heater assembly of FIG. 4.

Referring to FIGS. 4–6, a preferred embodiment 150 of the heater assembly is shown. Heater assembly 150 includes a first or upper heating component 154 and a second or lower heating component 156, which are respectively positioned above and below panel assembly 10', which is supported on a conveyor 152, and are adapted to move from a holding or non-heating position to a heating position, as will be more fully described below. Conveyor 152 is a conventional conveyor and includes a conveyor belt 152a which is driven by a conventional drive system. The drive system includes a gear box and motor 152b which is coupled to belt drive sprockets 152c by a drive chain 152d, all of which are supported by a conveyor frame 152e. Panel 10' is supported on conveyor 152 by a pair of locator members 153 which support panel 10' above and spaced from conveyor belt 152a with holders 153a which support panel assembly 10' inwardly of its outer periphery 18'. Locator members 153 are secured to conveyor belt 152a and are grouped in pairs which are sufficiently spaced apart along belt 152a so that only one panel at a time is positioned in heater 150. Panel assembly 10' may be of similar construction to panel assembly 10 and, therefore, for further details of panel assembly 10', reference is made to panel assembly 10.

Heating component 154 and heating component 156 are supported by a frame 159, which straddles conveyor belt 152a and panel assemblies 10. Frame 159 includes spaced apart column members 160 which are interconnected by upper and lower transverse members 162a and 162b and upper and lower lateral members 164a and 164b. It should be understood that frame members 160, 162a, 162b, 164a, and 164b may comprise conventional structural members, for example tube steel, angle members, or channel members. Frame 159 further includes movable upper support members 166a and 166b and movable lower support members 168a and 168b which respectively support heating component 154 and heating component 156 on frame 159. Each upper support member 166a and 166b preferably includes an elongate member 170a having a pair of threaded collars 172a and 172b at ends 171a and 171b, which are supported on and engage threaded shafts 176a, 176b, 176c, and 176d which are supported on frame 159. Each lower support member 168a, 168b similarly includes an elongate member 170b having threaded collars 174a and 174b at respective ends 173a, and 173b, which are supported on and engage threaded shafts 176a, 176b, 176c, and 176d. Shafts 176a, 176b, 176c, and 176d are supported by and extend between respective upper mounting brackets 178a, 178b, 178c, and 178d and lower mounting brackets 179a, 179b, 179c, and 179d, which in turn are respectively supported on upper and lower transverse members 162a and 162b. Threaded shafts 176a, 176b, 176c, and 176d are driven by a gear box and motor assembly 180, which is supported by frame 159 and coupled to respective sprocket gears 182a, 182b, 182c, and 182d, which are mounted to the upper ends of threaded shafts 176a, 176b, 176c, and 176d, by drive chains 184.

Each shaft 176a, 176b, 176c, and 176d preferably includes a first or upper portion and a second or lower portion which are threaded in opposite directions, so that when shafts 176a, 176b, 176c, and 176d are rotated and driven by gear box and motor assembly 180, upper support members 166a and 166b will move generally simultaneously in an opposite direction from lower supports 168a and 168b to move heating components 154 and 156 either toward panel assembly 10 to their respective heating positions or away from panel assembly 10 to their respective holding positions. Alternately, upper collar members 172a and 172b may be threaded in opposite directions from lower collar members 174a and 174b to achieve the same result.

Similar to the first embodiment, heating component 154 preferably includes a shortwave infrared radiation source, for example a plurality of shortwave infrared emitting lamps 158. Reference is made to lamps 58 of heating component 54 described in reference to heater 50 for further details of lamps 158. Lamps 158 are supported in a housing 185, which includes mounting flanges 186 for coupling heater housing 185 to upper movable supports 166a and 166b (FIG. 5) so that heating component 154 can be moved up and down shafts 176a, 176b, 176c, and 176d. Flanges 186 are preferably releasably secured to supports 166a and 166b by conventional fasteners, such as bolts or clamps so that heating component 154 may be removed for service or substitution.

Heating component 156 preferably includes a source of longwave infrared radiation, such as a quartz emitter similar to heater 56 of the first embodiment, which is supported in a housing 188. Similar to housing 185, housing 188 includes mounting flanges 190, which are coupled to movable supports 168a and 168b, for example by releasable fasteners, to permit repositioning of heater 156 from its holding position to its heating position. Since quartz emitters have a relatively long heat-up time, it is preferred to leave the longwave infrared radiators energized during the assembly process. In order to control the application of heat, therefore, heating components 154 and 156 are moved in relatively close proximity to panel assembly to heat panel assembly 10' and moved away from panel assembly 10' to essentially discontinue application of heat. In addition, the proximities of heating components 154 and 156 to panel 10' may be adjusted to control the heating process should the variations in the panel assembly affect the rate of heating. It should be understood, however, that lamps 158 (and lamps 58) have essentially no heat-up time and, therefore, lamps 158 (and 58) may be de-energized for conservation of energy. Optionally, heating component 154 may be supported in a fixed position. But, in order to accommodate varying dimensions between panel assemblies 10' it is preferred to provide frame 159 with upper and lower movable supports to permit repositioning of both heating components 154, 156 and which would additionally permit the positions of heating components 154 and 156 to be reversed if desired.

As best seen in FIG. 5, heater 150 also includes a heat localizer 195 which is interposed between first heating component 154 and panel assembly 10'. Heat localizer 195 is substantially similar to heat localizer 76 as described above. Alternatively, heat localizer 195 may be similar to heat localizer 76'. In this manner, the infrared radiation from lamps 158 is localized on the glass side of the adhesive or adhesive-free side of panel assembly 10 and is directed away from heat sensitive components, as described in reference to the first embodiment. In a similar manner to heat localizer 76, heat localizer 195 may be supported by heating component 154 or optionally supported by frame 159.

Panel assembly 10, 10' described above is manufactured according to a method which results in "ready-to-install" panel assembly. Heat activated adhesive bead 26 can be applied to the panel substrate 12 at a location remote from the production site, such as a "just-in-time" plant. This preassembly process eliminates a complicated step in the vehicle assembly line and removes the expense and problems of handling and precautionary measures that can be associated with the chemicals forming the adhesive and the adhesive primers. Panel assembly 10 or 10' is preferably heated using shortwave and longwave infrared radiation to activate the adhesive properties of heat activated adhesive bead 26. Furthermore, the adhesive properties of the bead are activated quickly. Alternatively, panel assembly 10 or 10' may be heated by shortwave infrared radiation, with the shortwave infrared radiation directed onto the non-adhesive side of panel assembly 10 and with a black body radiator positioned on the adhesive bearing side of panel assembly 10, as described earlier, which absorbs the shortwave infrared radiation and emits infrared radiation back toward the bead 26. Optionally, panel assembly 10 may be heated on both sides with shortwave infrared radiation or longwave infrared radiation. Moreover, the adhesive free side of panel assembly 10 may be heated with longwave infrared radiation, while the adhesive bearing side may be heated with the shortwave infrared radiation.

Once assembled, panel assembly 10 or 10' is delivered to the production site and placed on conveyor 52, 152 which then transports panel assembly 10, 10' to heater 50, 150, 50', 50", 50''', and 50'''' where heat is applied to panel assembly 10, 10'. Heat, preferably in the form of shortwave infrared radiation, is applied to the adhesive free side of the panel substrate 12 and, preferably, localized onto that portion of the adhesive free side of panel 12, through for example a shield 76 or heat director 76', which is aligned with bead 26 so that the panel substrate is heated in a localized area which corresponds to bead 26. Bead 26 in effect draws heat from the localized heated area of panel substrate 12 through its glass interface surface or base 30. Furthermore, heat, preferably in the form of longwave infrared radiation, is applied directly onto the bead side of panel assembly 10 to directly heat bead 26 through its skin surfaces. Preferably, the longwave infrared radiation is similarly directed to or localized on the bead, for example by way of a shield or by arranging the longwave infrared radiation source in a perimeter heater arrangement where the individual longwave infrared radiation sources are aligned with the bead. As a result, bead 26 is heated from two sides—base or interface region 30 and its outer skin surface region 32, 34. By indirectly applying the shortwave infrared radiation, which provides high energy heating, and directly applying the longwave infrared radiation to the bead, adhesive bead 26 is heated in a controlled fashion which achieves uniform heating of the bead and yet avoids degradation of the adhesive itself and further avoids degradation of the substrate panel and its surrounding attachments, including molded gaskets such as 20. Uniform heating of adhesive bead 26 assures appropriate retention of panel assembly 10, 10' in the vehicle.

As described previously, in order to uniformly heat the adhesive, the bead is preferably heated to an activation temperature in a range of about 50° C. to 160° C., more preferably, in a range of about 70° C. to 120° C., and, most preferably, in a range of about 80° C. to 110° C. By providing an adhesive with a minimum activation temperature, unintentional activations can be avoided. In addition, in order to reduce or eliminate surface degradation of adhesive bead 26, and/or of moldings, attachments, and structures that are attached to the panel and/or are used in forming the panel, the shortwave and longwave infrared radiation are balanced by a control system to maintain the temperature of the skin surface of bead 26 to be preferably less than about 170° C., more preferably less than about 140° C. and, most preferably, less than about 120° C. The balance of the shortwave and longwave radiation is achieved through sensors 198 (FIG. 5), which may mounted to heater 50, 150, 50', 50", 50''', and 50'''' to monitor the surface temperature of the adhesive bead. Sensors 198 are coupled to control assembly 200 (FIG. 5), which may provide a manual operation mode and/or may be preprogrammed to maintain the temperature of the adhesive bead to a desired temperature. Control assembly 200 is electrically coupled to gear box and motor assembly 180, which sends actuation signals to motor assembly 180 to control the position of heating components 154 and 156. Optionally, control assembly 200 may be further coupled to the individual infrared radiation sources in heating components 154 and 156 to provide an override in the event motor assembly 180 malfunctions or to provide adjustment of the levels of power delivered to the individual sources to thereby adjust the emission of heat from heating components 154 and 156.

In order to achieve the activation temperature of the adhesive bead and yet reduce the assembly time, the shortwave and longwave infrared radiation is preferably applied for at least one minute but for less than about twenty minutes, more preferably, less than about ten, and most preferably less than about five minutes. In preferred form, the shortwave and longwave infrared radiation is applied for less than about two minutes. However, in order to accommodate the flow of the assembly line conveyor, which for example may index or move a fixed distance about every 60 to about 90 seconds, the shortwave and longwave infrared radiation may be applied in stages. For example, where the total heat activation time is about 3 to about 5 minutes and the conveyor indexes about every 60 seconds, three or more stages would be required. Typically common, at least two heating stages are preferred. Most typically, four heating stages are preferred. Preferably, no more than four stages are used, although in some applications more than four stages may be desirable, with each of the heating stages aligned along the conveyor to avoid any additional handling requirements and in close proximity to the conveyor to avoid any cool down time. Optionally, a single lear or heat tunnel may be used, through which the glass is moved on the conveyor. For example, a single lear or heat tunnel which provides either continuous heating or provides discrete heating regions that are continuously operated.

As described previously, the ready-to-install (RTI) heat activatable adhesive is preferably applied to the vehicle window at a ready-to-install vehicle window facility that is remote from the vehicle assembly plant. The RTI adhesive is shipped to the vehicle assembly plant in an uncured or partially cured form. Upon arrival at the vehicle assembly plant, and preferably immediately adjacent the vehicle assembly line at the location where the windows are to be installed, the RTI adhesive is activated (most preferably by thermal activation although various forms of energy activation such as by microwave radiation, induction heating, and the like can be contemplated) to a state suitable to use as a window fixing adhesive for adhering the window to the vehicle body. Although described herein as a ready-to-install adhesive, this present invention contemplates that the adhesive as disposed on the surface of the window substrate (or on a polymer gasket itself attached to the vehicle window) can have a shape and form as applied with a cross-section that is square, rectangular, triangular, hemispherical, trapezoidal, quadrilateral, bimodal, or the like and optionally with a tip or apex portion that is narrower than the base that contacts the window substrate, and that it substantially retains that shape and form during shipment from the RTI adhesive remote facility to the vehicle assembly plant where activation of the RTI adhesive will occur.

It is preferable that the RTI facility operate as a just-in-time (JIT) supplier of RTI windows to the vehicle assembly plant. Most preferably, the vehicle assembly plant is supplied from the RTI window plant using just-in-time, in-sequence techniques, such as are commonly known in the automotive supply arts, and such as are commonly used such as to supply seats to vehicles. In such a process, the assembly plant contacts the RTI window facility at the moment a specific vehicle body passes a location on the assembly line (such as entering or exiting the paint shop). The vehicle maker places a specific order for a window (or window set such as a front windshield and a rear backlite) for that particular vehicle, and for those that preceded and followed that particular vehicle on the assembly line. Thus the ready-to-install window receives orders from the vehicle assembly plant for just-in-time delivery and, preferably, in-sequence delivery. The time window for fabrication of the RTI windows at the RTI window plant and/or their delivery to the vehicle assembly plant is at least about two hours, more preferably is at least about three hours, and most preferably is at least about four hours, and is less than about forty eight hours, more preferably is less than about twenty four hours and most preferably is less than about twelve hours. For example, a preferred time window for JIT/in-sequence supply is between three to nine hours after an order is received at the RTI window plant. Within this time window, the RTI window facility fabricates and/or ships a RTI window, or set of windows, for JIT receipt at the vehicle assembly line, and more preferably, for installation, in-sequence, at the vehicle assembly line. In this regard and in order to allow sufficient RTI window fabrication and/or shipping time for JIT/in-sequence supply to the vehicle assembly plant, it is preferable that the RTI window plant be located remote from, but close to, the vehicle assembly line (less than about 60 miles distance desired, less than about 30 miles more desirable, and less than about 15 miles most desirable). Most preferably, the RTI window production line would be located at or within the vehicle assembly plant itself, whereupon, the time window for RTI window fabrication and supply to the assembly line can be less than about two hours. Alternately, the RTI window production line could be located at a vehicle window fabrication facility such as within a glass vehicle window fabrication plant.

At the RTI window plant the RTI adhesive can be disposed onto the window substrate (such as about the perimeter of a glass windshield) by a variety of means. For example, it can be dispensed from a robotic arm mounted dispenser head. Preferably, the dispenser head is capable of providing a variable profile adhesive bead. Alternately, the RTI adhesive can be dispensed into a mold separate from the panel, with the mold locating the panel on the adhesive. With the RTI adhesive in the mold, the panel is located on the adhesive and these are forced together so that the RTI adhesive bead is transferred from its mold to the window panel, whereupon the panel, with RTI adhesive applied thereto, is shipped to the vehicle assembly plant, such as is described in U.S. Pat. No. 5,331,784 entitled VEHICULAR PANEL ASSEMBLY AND METHOD FOR MAKING SAME assigned to Donnelly Corporation of Holland, Mich., which is incorporated herein by reference in its entirety.

Accordingly, the invention provides a heater assembly and method useful in installing panel assemblies, including modular window assemblies, with a heat activated adhesive that permits quick installation without the manufacturing, handling, storage, and cleaning problems associated with the moisture cure adhesives used heretofore. The invention allows a panel assembly to be preassembled with the adhesive pre-applied and yet not activated until the panel assembly is ready to install.

For the purposes of the following description, the terms "upper," "lower," "vertical," and derivatives or equivalents thereof shall relate to the invention as oriented in FIGS. 1 to 7. It is understood that the invention may assume various alternative orientations, except where expressly specified to the contrary. For example, where panel assembly 10 or 10' is inverted, first and second heating components 54, 56, 154, and 156 may be reversed so that first heating components 54, 154 is positioned below panel assembly 10, 10' and second heater assembly 56, 156 is positioned above panel assembly 10, 10'. Furthermore, the number of heaters or stage heaters may be varied depending on the conveyor speed. Moreover, heaters 50 and 150 may assume different arrangements for supporting the infrared radiation sources. It is also understood that the specific devices and methods illustrated in the attached drawings, and described in the following specification, are simply exemplary embodiments of the inventive concepts defined in the appended claims. Further, while some forms of the invention have been shown and described, other forms will now be apparent to those skilled in the art. Therefore, it will be understood that the embodiment shown in the drawing and described above are merely for illustrative purposes, are not intended to limit the scope of the invention which is defined by the claims which follow at the end of the description.

We claim:

1. A method of activating a ready-to-install heat activated adhesive for attaching a vehicle window panel to a vehicle body on a vehicle assembly line, said method comprising:

providing the vehicle window panel having a peripheral portion and first and second opposed spaced sides;

applying a bead of the ready-to-install heat activated adhesive on the peripheral portion of the second side of the window panel at a location remote from the vehicle assembly line, the bead having a heat activation temperature above which the adhesive is activated to a state suitable to use as a window fixing adhesive for adhering the window panel to the vehicle body as the vehicle body passes along the vehicle assembly line, the bead further having a heat degradation temperature above which said adhesive degrades, the bead including an interface portion on the second side of the vehicle panel, a central core portion, and an outer skin portion;

heating the first side of the vehicle window panel proximate the vehicle assembly line whereby the panel heats the interface portion of the bead to heat the central core portion of the bead;

heating the second side of the vehicle window panel proximate the vehicle assembly line to heat the outer skin portion of the bead and thereby heat the central core portion of the bead;

at least one of said heating of the first side and said heating of the second side including localizing heating to said peripheral portion of the window panel;

wherein said heating of the first side and said heating of the second side of the vehicle window panel heats said central core portion to at least said heat activation temperature while maintaining the temperature of said outer skin portion below said heat degradation temperature.

2. The method of activating a ready-to-install heat activated adhesive according to claim 1, further comprising balancing the heat on the first side and the heat on the second side to heat the central core portion to at least said heat activation temperature while maintaining the temperature of the outer skin portion below said heat degradation temperature.

3. The method of activating a ready-to-install heat activated adhesive according to claim 1, further comprising balancing the heat on the first side and the heat on the second side to achieve a central core portion temperature of the bead in a range of about 50° C. to 160° C. while maintaining the temperature of the outer skin portion no more than about 40° C. greater than the central core portion temperature.

4. The method of activating a ready-to-install heat activated adhesive according to claim 3, wherein balancing includes balancing the heat on the first side and the heat on the second side to achieve a central core portion temperature of said bead in a range of about 70° C. to 120° C.

5. The method of activating a ready-to-install heat activated adhesive according to claim 3, wherein balancing includes maintaining the temperature of the outer skin portion of the bead of less than about 170° C.

6. The method of activating a ready-to-install heat activated adhesive according to claim 5 wherein balancing includes maintaining the temperature of the outer skin portion of the bead of less than about 140° C.

7. The method of activating a ready-to-install heat activated adhesive according to claim 3, wherein balancing includes balancing the heat on the first side and the heat on the second side to achieve a central core portion temperature of the bead in a range of about 80° C. to 110° C.

8. The method of activating a ready-to-install heat activated adhesive according to claim 1, further localizing the heat on the first side of the panel on a portion of the first side of the panel which is aligned with the bead.

9. The method of activating a ready-to-install heat activated adhesive according to claim 1, further localizing the heat on the second side on the bead.

10. The method of activating a ready-to-install heat activated adhesive according to claim 1, wherein heating the first side of the panel includes heating with shortwave infrared radiation.

11. The method of activating a ready-to-install heat activated adhesive according to claim 10, wherein heating with shortwave infrared radiation includes heating with shortwave infrared radiation having a peak emission of less than about 2.5 microns.

12. The method of activating a ready-to-install heat activated adhesive according to claim 10, further comprising at least partially shielding at least a central portion of the vehicle panel from the shortwave infrared radiation.

13. The method of activating a ready-to-install heat activated adhesive according to claim 10, further comprising at least partially shielding at least a peripheral portion of the vehicle panel from the shortwave infrared radiation.

14. The method of activating a ready-to-install heat activated adhesive according to claim 1, wherein heating the second side of the panel includes heating with longwave infrared radiation.

15. The method of activating a ready-to-install heat activated adhesive according to claim 14, wherein heating with longwave infrared radiation includes heating with a longwave infrared radiation having a peak emission greater than about 2.5 microns.

16. The method of activating a ready-to-install heat activated adhesive according to claim 14, further comprising at least partially shielding at least a central portion of the vehicle panel from the longwave infrared radiation.

17. The method of activating a ready-to-install heat activated adhesive according to claim 1, wherein one of heating the first side and heating the second side includes heating with shortwave infrared radiation and the other of heating the first side and heating the second side includes heating with longwave infrared radiation.

18. The method of activating a ready-to-install heat activated adhesive according to claim 17, wherein heating the first side includes heating the first side with shortwave infrared radiation.

19. The method of activating a ready-to-install heat activated adhesive according to claim 14, further comprising at least partially shielding at least a peripheral portion of the vehicle panel from the longwave infrared radiation.

20. A method of activating a ready-to-install heat activated adhesive for attaching a vehicle window panel to a vehicle body on a vehicle assembly line, said method comprising:

providing the vehicle window panel having a peripheral portion and first and second spaced surfaces;

applying a bead of heat activated adhesive on the peripheral portion of the second surface of the window panel at a location remote from the vehicle assembly line, the bead having a heat activation temperature above which the adhesive is activated to a state suitable to use as a window fixing adhesive for adhering the window panel to the vehicle body as the vehicle body passes along the vehicle assembly line, the bead further having a heat degradation temperature above which said adhesive degrades:

directing shortwave infrared radiation to the first surface of the vehicle window panel to heat the panel and to thereby indirectly heat the bead of heat activated adhesive;

directing heat energy to the bead to thereby heat the bead and to activate the adhesive;

at least one of said directing shortwave infrared radiation to the first surface of the window panel and said directing heat energy to the bead being localized to said peripheral portion of the window panel;

wherein said directing shortwave infrared radiation and said directing heat energy heats the bead to at least said heat activation temperature while maintaining the bead temperature below said heat degradation temperature.

21. The method of activating a ready-to-install heat activated adhesive according to claim 20, wherein directing heat energy comprises directing longwave infrared radiation.

22. The method of activating a ready-to-install heat activated adhesive according to claim 20, wherein directing shortwave infrared radiation includes directing shortwave infrared radiation having a peak emission of less than about 2.5 microns.

23. The method of activating a ready-to-install heat activated adhesive according to claim 22, wherein directing shortwave infrared radiation includes directing shortwave infrared radiation having a peak emission in a range of about 0.6 to 2.5 microns.

24. The method of activating a ready-to-install heat activated adhesive according to claim 22, wherein directing shortwave infrared radiation includes directing shortwave infrared radiation having a peak emission less than about 1.0 micron.

25. The method of activating a ready-to-install heat activated adhesive according to claim 21, wherein directing longwave infrared radiation includes directing longwave infrared radiation having a peak emission greater than about 2.5 microns.

26. The method of activating a ready-to-install heat activated adhesive according to claim 25, wherein directing longwave infrared radiation includes directing longwave infrared radiation having a peak emission in a range of about 2.5 to 8.0 microns.

27. The method of activating a ready-to-install heat activated adhesive according to claim 21, further comprising heating the bead to at least said heat activation temperature by direct application of the longwave infrared radiation and indirect application of the shortwave infrared radiation.

28. The method of activating a ready-to-install heat activated adhesive according to claim 27, further comprising heating a central core portion of the bead to at least said heat activation temperature while maintaining the temperature of an outer skin portion of the bead below said heat degradation temperature.

29. The method of activating a ready-to-install heat activated adhesive according to claim 27, wherein heating includes heating the central core portion of the bead to a temperature in a range of about 50° C. to 160° C.

30. The method of activating a ready-to-install heat activated adhesive according to claim 29 further comprising:

balancing the shortwave infrared radiation and the longwave infrared radiation to maintain the temperature of an outer skin portion of the bead no more than about 40° C. greater than the temperature of the central core portion of the bead.

31. The method of activating a ready-to-install heat activated adhesive according to claim 30, wherein balancing includes balancing the shortwave infrared radiation and the longwave infrared radiation to maintain the temperature of an outer skin portion of the bead no more than about 20° C. greater than the temperature of the central core portion of the bead.

32. The method of activating a ready-to-install heat activated adhesive according to claim 31, wherein balancing includes balancing the shortwave infrared radiation and the longwave infrared radiation to maintain the temperature of an outer skin portion of the bead no more than about 10° C. greater than the temperature of the central core portion of the bead.

33. The method of activating a ready-to-install heat activated adhesive according to claim 29, further comprising:

balancing the shortwave infrared radiation and the longwave infrared radiation to maintain the temperature of an outer skin portion of the bead less than about 170° C.

34. The method of activating a ready-to-install heat activated adhesive according to claim 33, wherein balancing includes balancing the shortwave infrared radiation and the longwave infrared radiation to maintain the temperature of an outer skin portion of the bead less than about 140° C.

35. The method of activating a ready-to-install heat activated adhesive according to claim 34, wherein balancing includes balancing the shortwave infrared radiation and the longwave infrared radiation to maintain the temperature of an outer skin portion of the bead less than about 120° C.

36. The method of activating a ready-to-install heat activated adhesive according to claim 29, wherein heating includes heating the central core portion of the bead to a temperature in a range of about 70° C. to 120° C.

37. The method of activating a ready-to-install heat activated adhesive according to claim 27, wherein heating includes heating the central core portion of the bead to a temperature in a range of about 80° C. to 110° C.

38. The method of activating a ready-to-install heat activated adhesive according to claim 37, further comprising:

balancing the shortwave infrared radiation and the longwave infrared radiation to maintain the temperature of an outer skin portion of the bead no more than 40° C. greater than the temperature of the central core portion of the bead.

39. The method of activating a ready-to-install heat activated adhesive according to claim 38, wherein balancing includes balancing the shortwave infrared radiation and the longwave infrared radiation to maintain the temperature of an outer skin portion of the bead no more than 20° C. greater than the temperature of the central core portion of the bead.

40. The method of activating a ready-to-install heat activated adhesive according to claim 39, wherein balancing includes balancing the shortwave infrared radiation and the longwave infrared radiation to maintain the temperature of an outer skin portion of the bead no more than 10° C. greater than the temperature of the central core portion of the bead.

41. The method of activating a ready-to-install heat activated adhesive according to claim 21, wherein directing the shortwave infrared radiation and directing the longwave infrared radiation includes directing the shortwave infrared radiation and the longwave infrared radiation for less than about 20 minutes.

42. The method of activating a ready-to-install heat activated adhesive according to claim 21, wherein directing the shortwave infrared radiation and the longwave infrared radiation includes directing the shortwave infrared radiation and the longwave infrared radiation for less than about 10 minutes.

43. The method of activating a ready-to-install heat activated adhesive according to claim 20, further comprising supporting the panel on a conveyor.

44. The method of activating a ready-to-install heat activated adhesive according to claim 43, further comprising moving the panel with the conveyor a fixed distance at generally uniformly spaced intervals of time to define a plurality of heating stages.

45. The method of activating a ready-to-install heat activated adhesive according to claim 44, wherein said directing the shortwave infrared radiation and directing the longwave infrared radiation includes directing the shortwave infrared radiation and the longwave infrared radiation in at least two heating stages, each of the heating stages corresponding to one of the heating stages of the conveyor.

46. The method of activating a ready-to-install heat activated adhesive according to claim 45, wherein directing the shortwave infrared radiation and the longwave infrared radiation includes directing the shortwave infrared radiation and the longwave infrared radiation in no more than four heating stages.

47. The method of activating a ready-to-install heat activated adhesive according to claim 20, wherein directing heat energy includes applying hot air onto the bead.

48. The method of activating a ready-to-install heat activated adhesive according to claim 21, further comprising localizing the longwave infrared radiation on the bead.

49. The method of activating a ready-to-install heat activated adhesive according to claim 48, wherein said localizing includes providing a perimeter heater which emits longwave infrared radiation along a perimeter of the panel corresponding to the location of the bead.

50. The method of activating a ready-to-install heat activated adhesive according to claim 48, wherein said localizing includes shielding a central portion of the vehicle panel from the longwave infrared radiation.

51. The method of activating a ready-to-install heat activated adhesive according to claim 48, wherein said localizing includes providing a heat director for directing the longwave infrared radiation onto the bead.

52. The method of activating a ready-to-install heat activated adhesive according to claim 20, further comprising localizing the shortwave infrared radiation onto a portion of the first surface of the panel, the portion being aligned with the bead.

53. The method of activating a ready-to-install heat activated adhesive according to claim 52, wherein localizing includes directing the shortwave infrared radiation onto the portion of the first surface of the panel to protect at least one of a central portion of the panel and heat sensitive attachments on the panel from the shortwave radiation.

54. The method of activating a ready-to-install heat activated adhesive according to claim 53, wherein localizing includes shielding at least one of a central portion of the panel and heat sensitive attachments on the panel from the shortwave radiation.

* * * * *

UNITED STATES PATENT AND TRADEMARK OFFICE
CERTIFICATE OF CORRECTION

PATENT NO. : 6,054,001
DATED : April 25, 2000
INVENTOR(S) : Douglas R. Swanson, David E. Nestell and Niall R. Lynam It is certified that error appears in the above-identified patent and that said Letters Patent is hereby corrected as shown below:

Column 1,
Line 55, "linetime" should be -- line-time --

Column 14,
Line 66, "," should be -- . -- after "panel"

Signed and Sealed this

Twenty-third Day of October, 2001

Attest:

*Attesting Officer*

NICHOLAS P. GODICI
*Acting Director of the United States Patent and Trademark Office*